Sept. 20, 1971   A. L. ALLRED   3,606,193
CRANK FOR FISHING REEL
Filed July 19, 1968

*INVENTOR.*
ARTHUR L. ALLRED

United States Patent Office 3,606,193
Patented Sept. 20, 1971

3,606,193
CRANK FOR FISHING REEL
Arthur L. Allred, 929 Norwood Ave.,
High Point, N.C. 27262
Filed July 19, 1968, Ser. No. 746,037
Int. Cl. G05g 1/00; A01k 89/00
U.S. Cl. 242—84.1J                          2 Claims

ABSTRACT OF THE DISCLOSURE

An adjustably extensible handle for attachment to the driving boss of a conventional fishing reel. The handle includes a crank arm having a knob at one end and an elongated slot positioned over the boss and retained thereon by a clamping plate. The clamping plate has a serrated opening fitting over a correspondingly shaped spool drive spindle of the reel and is retained thereon by an offset screw seated in a tapped opening in the driving boss. The elongated slotted portion of the handle is slidable on the boss to attain the crank arm length desired after which a resilient finger of the clamp inhibits free displacement of the crank on the boss.

BACKGROUND OF INVENTION

Conventional fishing reels are provided with a fixed length crank arm which will govern the rate of reel rotation provided the operator maintains a constant angular rate of rotation during reeling. Various conventional types of fishing reels also include gear trains with switching mechanisms for increasing or decreasing the rate of reel rotation but such mechanisms are costly. Utilizing a fixed crank arm length controls the leverage exerted by an operator although the torque may be required to be varied depending upon the load exerted on the fishing line. A prior attempt at varying the length of the crank arm for driving the reel is shown in U.S. Pat. No. 250,165 wherein the telescoping tubular members permit an increased lever arm to be formed at specific longitudinal positions by the inner telecscoping extensible member being withdrawn axially from a fixed outer member. However, the various approaches do not appear to be practical or economical.

DESCRIPTION OF INVENTION

The fishing reel of this invention incorporates preferably a unitary or integral crank arm that is entirely displaceable by sliding between extreme limits for maximum and minimum leverage conditions and with many intermediate positions being available as desired by the operator. Therefore, it is an objective of this invention to provide a novel fishing reel utilizing a crank arm assembly that is displaceable slidably between limits and in which the crank arm may be retained at any desired intermediate position between limits for the desired or requisite leverage.

Another objective of this invention is to provide a fishing reel having an integral or unitary crank arm in which the leverage applied to the reel and line may be controlled and varied by the operator continuously during reeling the line, depending upon the force or torque necessary.

Still another objective of this invention is to provide a fixed length crank arm capable of applying variable torques to a fishing reel that may be readily adaptable for use with conventional fishing reels and installed with minimum modification and expense.

Other objectives and many of the attendant advantages of this invention will become more readily apparent to those skilled in the fishing art.

DRAWING DESCRIPTION

A preferred embodiment of this invention is illustrated in the drawing wherein.

DETAILED DESCRIPTION OF THE INVENTION

Figure 1:
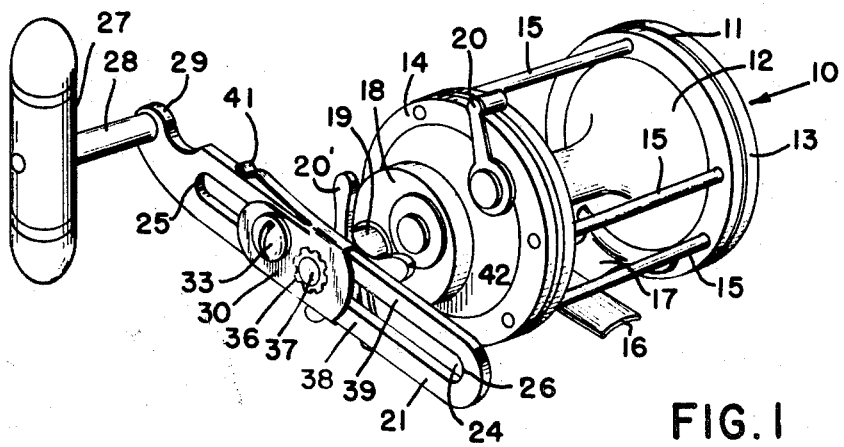
FIG. 1 is a front perspective view of a preferred form of a fishing reel utilizing the novel crank arm of this invention and illustrating the crank arm in an intermediate cranking position between the extreme limits of crank arm displacement.
Figure 4:
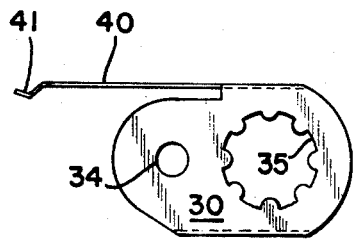
FIG. 4 is an enlarged plan view of the crank arm clamping guide.
Figure 5:
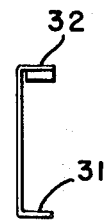
FIG. 5 is an end view of the crank arm clamping guide of FIG. 3.
Figure 3:
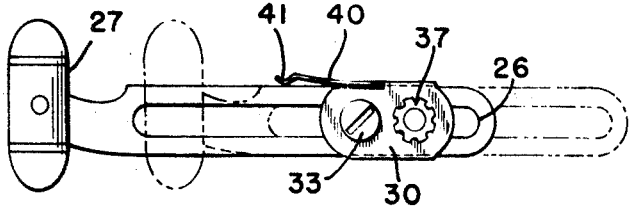
FIG. 3 is a slightly reduced left end view of the crank arm assembly of FIG. 1 illustrating the crank arm in another intermediate position from that shown in FIG. 1, in full line form, and at another intermediate position in outline form only.

In the preferred form of the invention shown in FIG. 1, a conventional fishing reel 10 is shown in which the housing or cage 11 bearingly supports the reel 12 for rotation between the end flanges 13 and 14. The flange dowel spacer bars 15 are circumferentially spaced from each other and extend between the flanges 13 and 14 with the fishing rod supporting bracket 16 being mounted intermediate the width of the reel on the rod supporting bracket base 17 that reaches and is fastened at opposed ends to the flanges 13 and 14.

Reel 12 is driven through a conventional drive gear train (not shown) that is mounted in the gear housing 18 with the train being driven by the projecting spindle 19. A free-rotation reel disengaging lever 20 is mounted on the flange 14 permitting engagement and disengagement of the gear drive train and the reel 12, and a starwheel clutch 20 of conventional construction is mounted adjacent to the end of the spindle 19.

An integral or unitary crank arm 21, the cranking leverage of which may vary, is positioned on the free terminal end of the spindle 19 and is contiguous with the guide plate 22 that is supported on the spindle 19. The guide plate 22 is provided with a crank arm slot-receiving boss 23 which cooperatively receives in sliding engagement the elongated slot 24 in the crank arm 21 normally permitting the crank arm 21 to slide freely between the inner and outer limits 25 and 26 of the crank arm, depending upon the leverage to be exerted by the crank arm. The crank arm actuating handle 27 is rotatably supported on the crank arm dowel 28 that is fastened to the operating end 29 of the crank arm 21.

A crank arm clamping guide 30, provided with inwardly turned flanges 31 and 32, is securely mounted to the plate 22 by means of the clamping screw 33 which is threadably connected to the plate 22. Screw 33 passes through the opening 34 in the clamping guide 30. The serrated opening 35 in the clamping guide 30 cooperatively receives the serrated head 36 of the spindle mounted bolt 37 and prevents rotation of the guide 30 when positioned. The slot-receiving boss 23 will be substantially flush with the outside surface of the crank arm 21 permitting sufficient tolerance for the crank arm to slide freely on the boss 23, through the guide slot 24 in the crank arm, while being guidably restrained by the projecting, enlarged head of the bolt 37 which will engage the longitudinally extending parallel reaches 38 and 39 of the crank arm 21.

Figure 2:
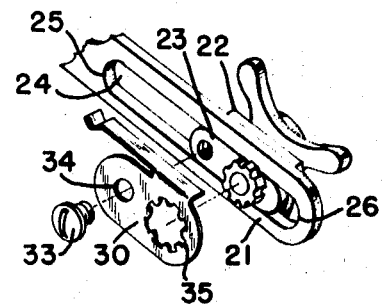
FIG. 2 is a partial perspective and exploded view of the connection between the reel spindle and the crank arm and guide.

The crank arm clamping guide 30 is provided with a projecting resilient finger 40 which extends from the flange 32 with the terminal crank arm engaging lip 41 resiliently engaging and clamping the crank arm 21 in any intermediate position, as shown in FIGS. 1 and 2, between the inner and outer limits 25 and 26 of travel of the crank arm 21. The lip 41 will engage the smooth track 42 of the crank arm 21 and exert sufficient spring pressure thereagainst to prevent free and uncontrolled sliding action of the crank arm on the plate boss 23. Increased resistance may be exerted by tightening the screw 33, if desired, or arching the resilient finger 40 to provide greater force against the track 42.

In operation, for increased speed in reeling, the crank arm will be positioned with the inner limit 25 substantially adjacent to the screw 33 which will result in minimum leverage. For maximum leverage, the crank arm will be extended so that the outer limit position 26 will be adjacent to the nut 36. Intermediate positions may be readily achieved simply by sliding the crank arm between the inner and outer limits, as desired, and this may be achieved while the operator reels the line.

Obviously, many modifications may be made in the invention to achieve the desired advantages which will be fully understood from the foregoing description, and various modifications and changes may be made with the parts without departing from the spirit or scope of the invention within the scope of the appended claims.

What is claimed is:

1. In combination with a fishing tackle having a reel rotatably and bearingly supported in a housing and a driving spindle with means for cooperatively driving said reel, the improvement comprising: a driving crank arm including a track portion having a handle at one end thereof, means securing said crank arm to said spindle for slidable displacement between limits, and clamping means resiliently urging said crank arm to retain a selected position intermediate the displaceable limits of said crank arm, said clamping means being secured to said spindle and including a projecting portion for continuously, resiliently engaging said track portion of said crank arm to inhibit free displacement of said crank arm, said clamping means having a plate for engaging said crank arm, and means for releasably retaining said plate against said crank arm for controlling the displacement of said crank arm relative to said plate.

2. In combination with a fishing tackle having a reel rotatably and bearingly supported in a housing and a driving spindle with means for cooperatively driving said reel, the improvement comprising: a driving crank arm including a track portion having a handle at one end thereof, means securing said crank arm to said spindle for slidable displacement between limits, and clamping means resiliently urging said crank arm to retain a selected position intermediate the displaceable limits of the crank arm, said clamping means being secured to said spindle and including a projecting portion for continuously, resiliently engaging said track portion of said crank arm to inhibit free displacement of said crank arm, said clamping means including a guide plate provided with flange portions for slidably engaging said driving crank arm, said projecting portion comprising a finger and crank arm engaging lip integral with one of said flange portions.

References Cited

UNITED STATES PATENTS

| | | | |
|---|---|---|---|
| 250,165 | 11/1881 | Palmer | 242—84.1 |
| 742,587 | 10/1903 | Carlton | 74—546 |
| 2,162,173 | 6/1939 | Huntington, Jr. | 74—546 |
| 2,189,654 | 2/1940 | Rief | 242—84.1UX |
| 2,326,023 | 8/1943 | Fredricksen | 74—546 |
| 2,713,366 | 7/1955 | Kennedy | 74—546X |

BILLY S. TAYLOR, Primary Examiner

U.S. Cl. X.R.

74—546